(No Model.)
5 Sheets—Sheet 1.
G. W. HOMSHER.
FENCE MACHINE.
No. 322,822. Patented July 21, 1885.
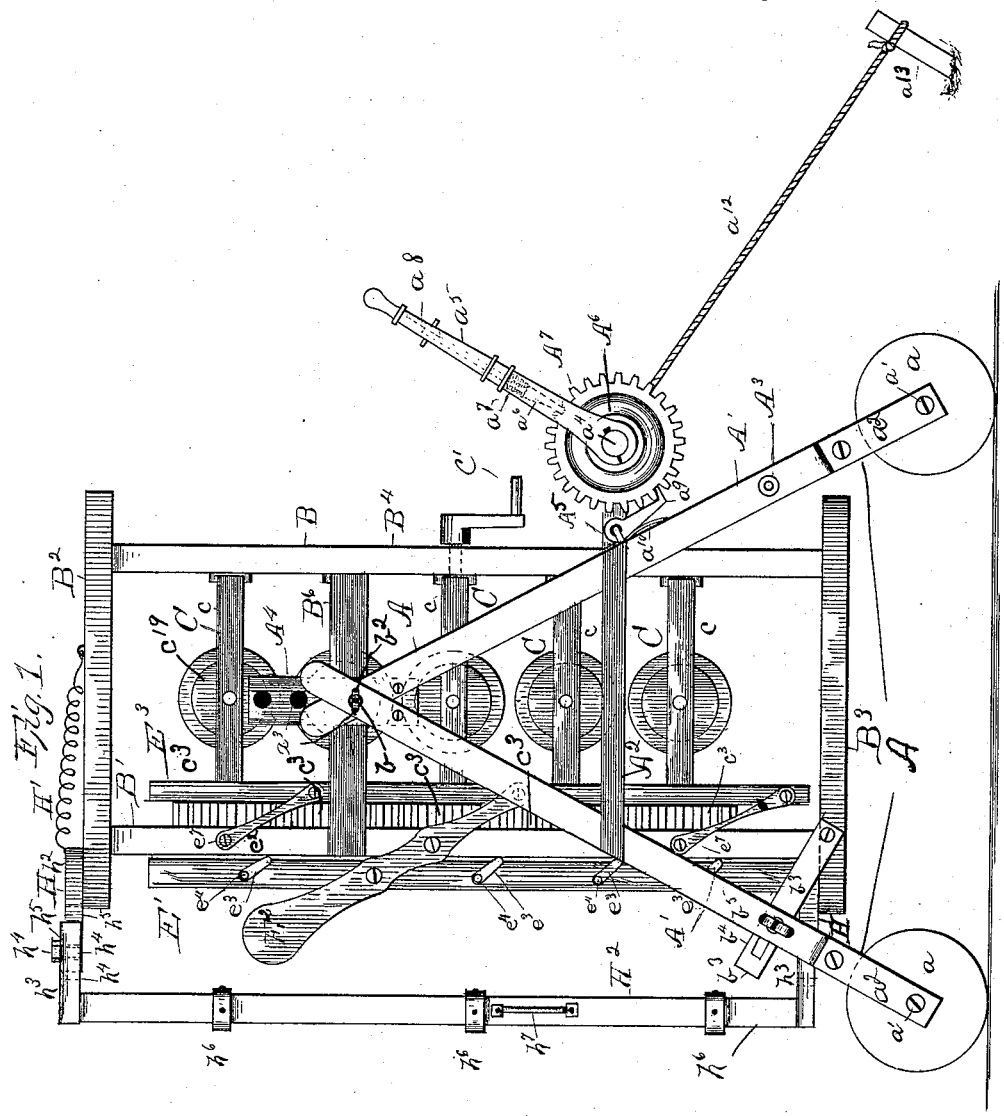
Witnesses:
T. F. Holden.
Geo. R. Byington.
Inventor
Geo. W. Homsher
per Hallock & Hallock
Attys (No Model.) 5 Sheets—Sheet 2.
G. W. HOMSHER.
FENCE MACHINE.
No. 322,822. Patented July 21, 1885.
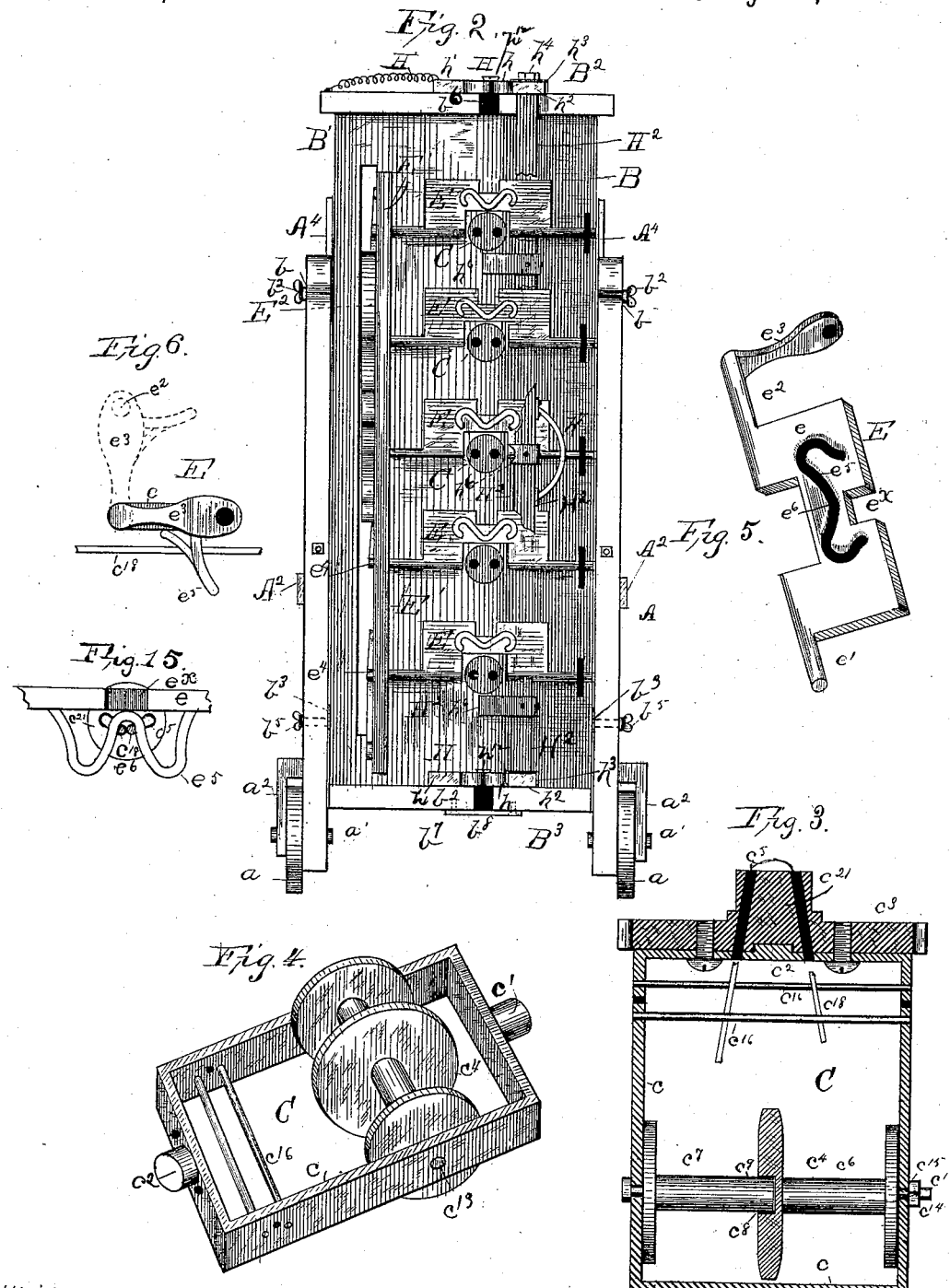
Witnesses:
T. F. Holden
R. G. Amies
Inventor
Geo. W. Homsher
per Hallock & Hallock
Attys.

(No Model.) 5 Sheets—Sheet 3.
G. W. HOMSHER.
FENCE MACHINE.
No. 322,822. Patented July 21, 1885.
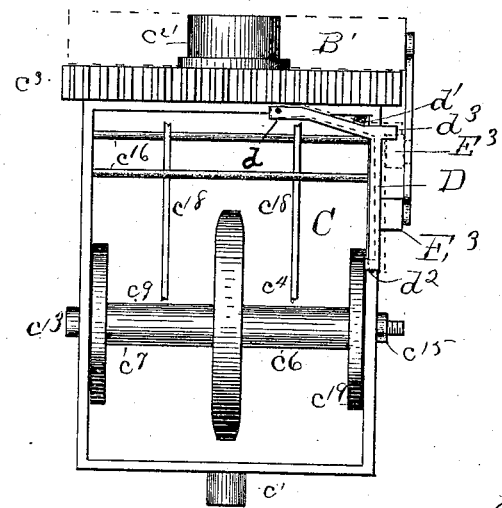
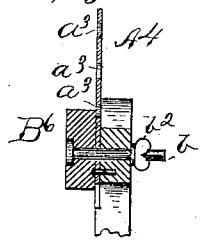
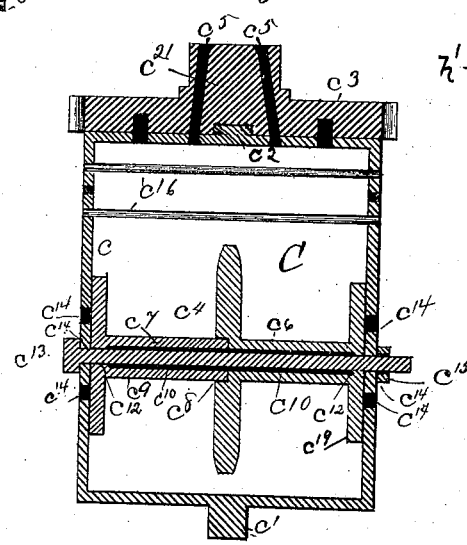
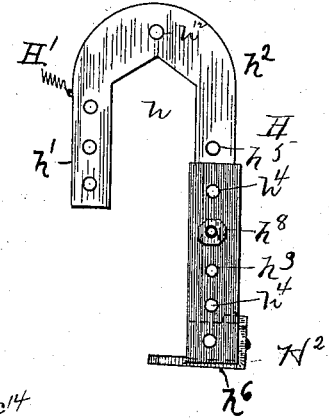
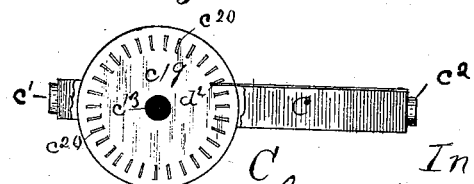
Witnesses: Inventor.

(No Model.) 5 Sheets—Sheet 4.
G. W. HOMSHER.
FENCE MACHINE.
No. 322,822. Patented July 21, 1885.
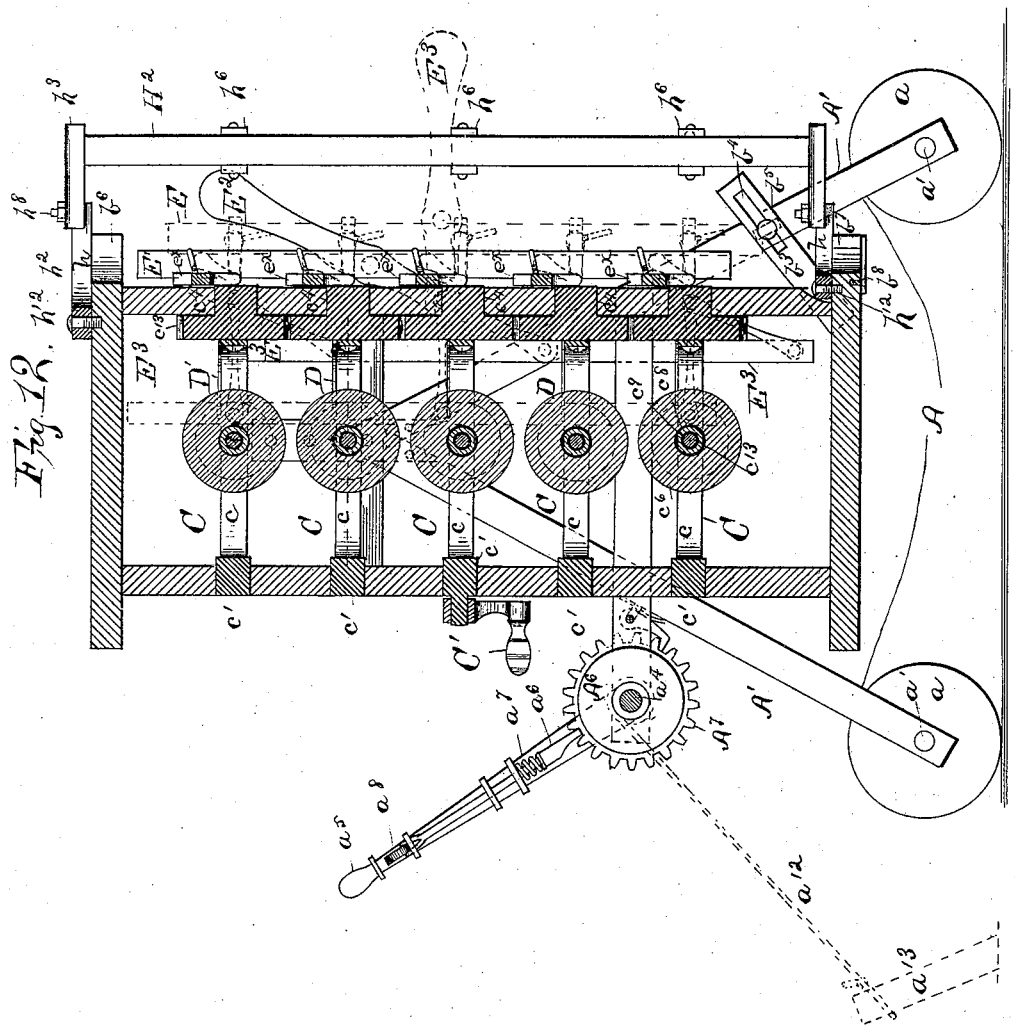
Witnesses:
T. F. Holden.
Geo. R. Byington.
Inventor
Geo. W. Homsher
per Hallock & Hallock
Attys (No Model.) 5 Sheets—Sheet 5.
G. W. HOMSHER.
FENCE MACHINE.
No. 322,822. Patented July 21, 1885.
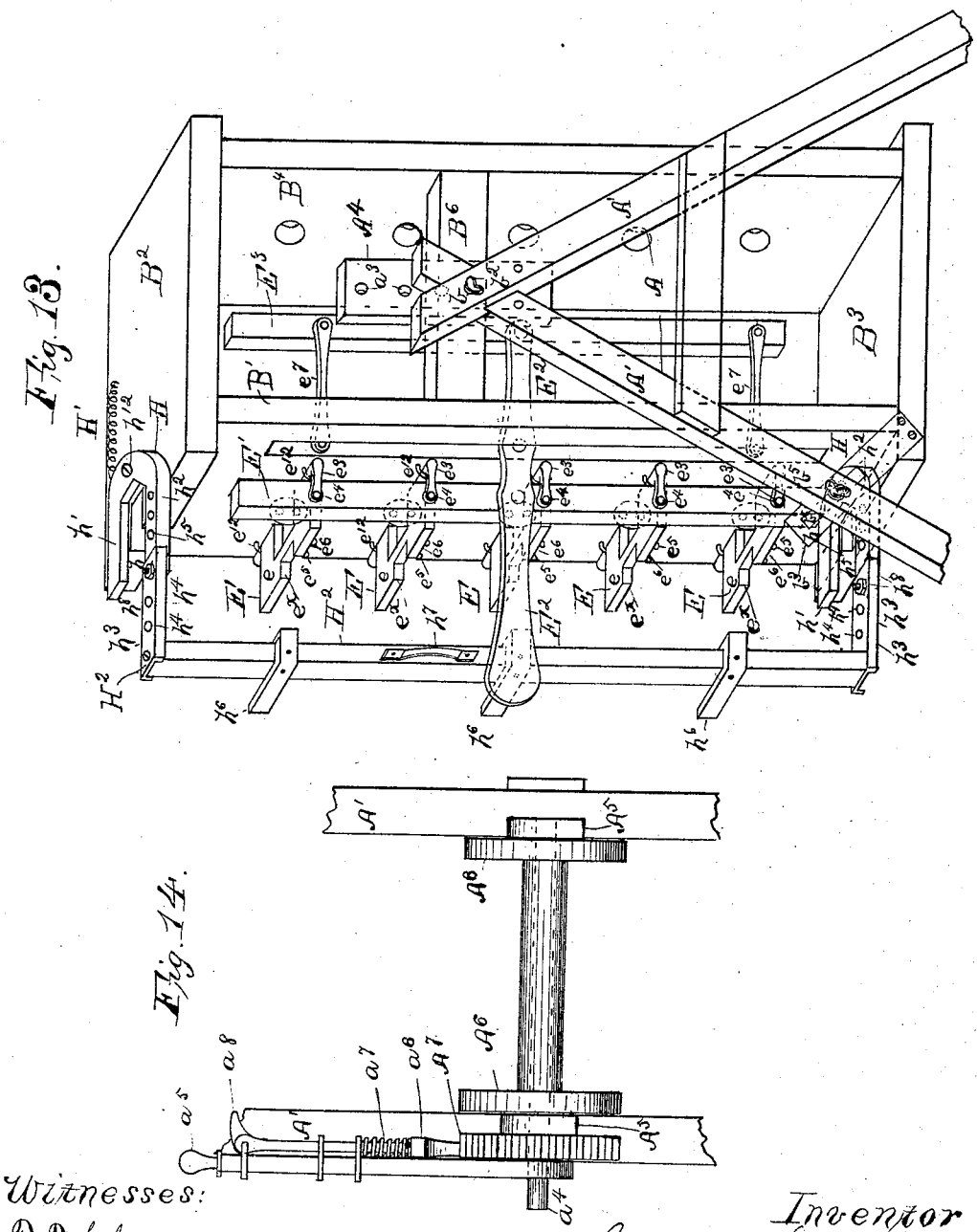

UNITED STATES PATENT OFFICE.

GEORGE W. HOMSHER, OF DUBLIN, INDIANA.

FENCE-MACHINE.

SPECIFICATION forming part of Letters Patent No. 322,822, dated July 21, 1885.

Application filed May 20, 1885. (No model.)

*To all whom it may concern:*

Be it known that I, GEORGE W. HOMSHER, a citizen of the United States, residing at Dublin, in the county of Wayne and State of Indiana, have invented certain new and useful Improvements in Fence-Machines; and I do hereby declare the following to be a full, clear, and exact description of the invention, such as will enable others skilled in the art to which it appertains to make and use the same.

My invention relates, generally, to that class of fence-machines which make a combined picket and wire fence, and particularly relates to that class of machines in which the fence is made and put in place at the same time.

The nature of my invention consists of constructions and combinations, all as will hereinafter be described and claimed, reference being had to the accompanying drawings, in which—

Figure 1 represents a side elevation; Fig. 2, a front elevation; Fig. 3, a transverse section of one of the twisters; Fig. 4, a perspective of one of the twisters; Fig. 5, a perspective of one of the knockers; Fig. 6, a side elevation of one of the knockers, showing the position when clasping the wires, the dotted lines showing it raised, as in Fig. 2; Fig. 7, a top plan of one of the twisters, showing the reel-brake; Fig. 8, a transverse section of the twister-frame, showing the manner of connecting the reels; Fig. 9, a partial side elevation of one of the twisters. Figs. 10 and 11 are details; Fig. 12, a longitudinal section of the machine; Fig. 13, a perspective of the machine with reels, &c., removed; Fig. 14, a detail showing the drum and its operative parts; Fig. 15, a detail representing a front view of the knocker when in the position shown in Fig. 6.

A represents a carriage mounted upon wheels $a$, and B the twisting-frame pivotally hung in said carriage.

The carriage is composed of inclined stanchions A', connected together by bars A$^2$ and removable rods A$^3$, the ends of which are shown in Fig. 1. The wheels $a$ are attached to the lower end of the stanchions A' in any suitable manner, but preferably by means of a shaft, $a'$, which is journaled in the stanchions, and the angle-plate $a^2$, which is attached as shown. In the top of the stanchions is fixed an extension or plate, A$^4$, having bearings $a^3$ arranged in a vertical row for the trunnions $b$ of the loom. The plate may be dispensed with, if desired, and the trunnions journaled directly in the stanchions; but plate A$^4$ is preferred, as by this means I am enabled to adjust the twisting-frame vertically, as the trunnions $b$ consist of a headed bolt which passes from the inside of the brace-bar B$^6$ to the outside of the stanchions, where it is provided with a nut, $b^2$, for holding the parts in place.

On the front end of the twisting-frame are pivoted the bars $b^3$, having slots $b^4$ for the set-screws $b^5$, which, when loosened, permit the twisting-frame to assume a vertical position, no matter at what angle or inclination the carriage A may be. When the carriage has assumed the proper position, the screw is set to clamp the bars and stanchions together in a fixed position.

Attached to the rear of the stanchions between the trunnions and the ground are arms A$^5$, having journaled thereon the shaft of a drum, A$^6$, provided with the pinion A$^7$, which is fixed on the drum-shaft $a^4$. On this shaft is loosely journaled a hand-lever, $a^5$, having the pawl $a^6$, which is held in contact with the pinion A$^7$ by the spring $a^7$, and withdrawn by pressing upon the handle $a^8$. The parts $a^6$, $a^7$, and $a^8$ are shown in dotted lines, Fig. 1. To prevent the drum from slipping or revolving, a pawl, $a^9$, is held in contact with the pinion A$^7$ by the spring $a^{10}$. To the drum is attached a cable, $a^{12}$, which may be attached to a post or stake, $a^{13}$, placed at any desired point in the rear of the machine. The function of these parts will be more fully described hereinafter.

The twisting-frame B consists of the frame B', B$^2$, B$^3$, and B$^4$, and the twisters C. These twisters consist of the frame $c$, having the journal $c'$ and stub $c^2$, cog-wheel $c^3$, and the reel $c^4$. The cog-wheel $c^3$ is clamped to the frame in any suitable manner, and provided with a recess for the stub $c^2$, and with a needle-head, $c^{21}$, which projects through the upright B' and serves as a journal for the twister. This head or journal is provided with angular or oblique eyes $c^5$ for the wire to pass through. The ends of the eyes may be slightly reamed or enlarged to permit the wire to enter and leave the eyes without breakage of the wire, which sometimes occurs when the wire is passed over the sharp corners of unreamed eyes. The reel $c^4$ is formed of two sections, $c^6$ and $c^7$. The section $c^6$ is provided with the annular recess $c^8$ for the hub $c^9$ of section $c^7$, which is journaled therein, so that the wire on either section may be adjusted without disturbing the other section. Through the longitudinal center of the reel is formed a passage, $c^{10}$, having its ends $c^{12}$ reduced or bushed to form bearings for the shaft $c^{13}$, which extends through said passage and the openings $c^{14}$ in the frame. This shaft is provided at one end with a head, and is screw-threaded at the other for the clamping-nut $c^{15}$, which, when the sides of the frame are made of springy metal, can be made to force said sides against the ends of the spools, and thus increase the tension. The reels may be shifted by withdrawing the bolt and inserting it into any of the openings $c^{14}$, the object being to regulate the distance between the spools and the head.

Ordinarily the tension produced by the inclined eyes is sufficient for my purpose, as the contact of the wire with one of the walls of the eyes will produce friction enough for that purpose. When, however, fine wire is used, it may be desirable to provide means for producing greater friction, and this is accomplished by means of the bars $c^{16}$, which are attached to the frame between the reels and eyes in such manner that the wires $c^{18}$ may be in frictional contact with them, preferably passing over the one nearest the head and under the one nearest the reel. It is often desirable after placing the pickets in place to prevent the wires from slipping. To accomplish this an angular brake, D, is pivotally fastened to the top of frame $c$ at the end $d$, and is held in contact with the flange $c^{19}$ by means of a spring, $d'$, which is fastened to the frame. The end of the brake which comes in contact with the spool is provided with a lip, $d^2$, which is normally in contact with the projections $c^{20}$ on said flange $c^{19}$. Upon the angular end is a lip, $d^3$, which projects beyond the frame, for a purpose hereinafter described.

The twisters are journaled in the frame in a vertical series, the cog-wheel of the upper twister meshing with the cog-wheel of the next twister, and its cog-wheel meshes with the one below, and so on through the whole series. They are operated by any suitable mechanism—such as a crank, C'. On the front upright and above all the eyes are arranged the knockers E, formed of a flange, $e$, having recess $e^x$, and journals $e'$ and $e^2$, which are held in place by straps $e^{12}$. Upon journal $e^2$ is a crank, $e^3$, loosely attached to the bar E' by pin $e^4$, so that when the bar is moved outwardly the flange will be turned horizontally.

Upon the face of the flange is a projection, $e^5$, formed of wire, and having the recess $e^6$ provided with inclined walls, which bring the wires close together. In Fig. 15 the relative positions of the projections $e^5$ and head of the twister are more plainly shown. The projection is preferably made in the form shown in Figs. 2, 5, 6, and 15; but it is obvious that a projection could be formed upon the knocker by other means, as the essential feature of the projection is the recess $e^6$, the walls of which embrace the wire when the knocker is in the position shown in full lines in Figs. 6, 13, and 15, and dotted lines, Fig. 12.

The bar E' is attached to the upright by a lever, $E^2$, fulcrumed upon said upright and pivoted to the bar, so that when the bar is depressed and thrown outwardly the flanges will be moved into a horizontal position, as shown in Fig. 6, and the recesses $e^x$ will prevent lateral movement of the picket and the recesses $e^6$ will embrace and press the wires together while they are being twisted.

If desired, the lever $E^2$ may be extended beyond the upright B' to connect with a bar, $E^3$, connected to the upright by links $e^7$. This bar, when the pickets are being placed in front of the heads and between the wires, will be in the position shown in Figs. 1 and 12, and in dotted lines, Fig. 7, so as to be in contact with the lip $d^3$ and move the brake D to the position shown in dotted lines in Fig. 7. The reels are now free to revolve, so that when the machine is drawn away from the picket that has been bound the wires will unwind sufficiently to permit of the insertion of another picket. When the lever $E^2$ is drawn into a horizontal or nearly horizontal position, it forces the bar $E^3$ to the position shown in full lines, Figs. 7 and 13, and dotted lines, Fig. 12, so that the spring $d'$ will press upon the brake D and place it in the position shown in full lines, Fig. 7, wherein the lip $d^2$ is shown in contact with the projections $c^{20}$ on the flange $c^{19}$ of the spool. The twisters C can now be revolved to twist the wires between the picket and twisting-head, and no wire will pass from the reels during this operation.

In the front part of the top $B^2$ and bottom $B^3$, respectively, are formed recesses $b^6$ and $b^7$ for the slats. The recess $b^7$ is provided with a bottom, $b^8$, clamped to the bottom $B^3$ of the loom. Pivoted to top $B^2$ and to the bottom $B^3$, by pins $h^{12}$, are curved arms H, each having recess $h$ for the pickets to pass through, and are held in their normal position by the spring H', attached to the short arm $h'$ and the top $B^2$. Upon the long arms $h^2$ is the gage-bar $H^2$, having flanges $h^3$, provided with perforations $h^4$, (shown in dotted lines in Fig. 1,) and which can be made to register with perforations $h^5$ in arms $h^2$, so that the gage-bar can be adjusted at any desired distance from the loom and clamped in place by the bolt $h^8$, which passes through the perforations $h^4$ and $h^5$, as shown in Fig. 1. The gage-bar is provided with arms $h^6$, which stop the picket when the machine is moved back, and with a handle, $h^7$, for drawing the gage-bar and arms out of the way of and to let the picket pass when the machine is moved toward the stake $a^{13}$. The hold upon the handle is released after the picket has passed, and the gage-bar by the retraction of spring H' assumes its normal position, which is that shown in Figs. 1 and 2.

The operation of the device is as follows: The machine is placed close to a post and the wires attached thereto. If any of the wires be drawn out too far they can be readily adjusted by turning its particular section of the reel on which it is wound. Several turns are now given to the twisters to tighten the wires around the post. The machine is now drawn back a sufficient distance to permit a picket to be inserted between the wires. This picket is guided into place by the recesses $e^6$, and as soon as it has reached the bottom $b^8$ of recess $b^7$ the lever $E^2$ is operated to force the bar $E'$ outwardly and downwardly. This movement forces the flange $e$ into a horizontal position, and necessarily forces the pickets into the wires, which are held close together by the walls of recess $e^6$. The same movement operates the bar $E^3$, which draws away from the lip $d^3$ and permits the brake to catch in the teeth on the flange of the spool, thus allowing the twisters to revolve without said spools turning or allowing the wires to be drawn off. Power is now applied to the crank $C'$, which revolves one of the twisters and those geared with it. The wires from each twister are held in place by the recess $e^6$ and twisted together. The drum is now turned to draw the machine away from the post, the distance being regulated by the arms $h^6$ on the gage-bar. The same operation is repeated with another picket, and when the machine is drawn back again the gage-bar $H^2$ is drawn back by the handle $h^7$ until the first picket has passed, when the hold on the handle is released and the gage-bar drawn back to its normal position by the spring $H'$.

In passing over uneven ground a board or plank is placed upon the ground for the wheels to rest upon, so that if the ground be full of holes or small irregularities or inequalities the machine will not be thrown out of line. If, however, the ground be hilly, the adjusting mechanism must be used, else the pickets will be placed in the fence at different angles. To overcome this defect it will only be necessary to adjust the position of the twisting-frame by means of the slotted bars, so that the line upon which the pickets are placed will be the same for the whole length.

It may sometimes be desirable to raise or lower the twisting-frame, and that is accomplished by means of the trunnions. It will be noted that the drum is placed about midway between the trunnions and the ground, so that the line of draft will be upon the center of the machine and prevent any tendency to topple forward or backward, and at the same time relieve it of any tendency to lay or chuck, as would be the case if the line of draft were substantially varied from this position.

What I claim as new is—

1. In a fence-machine, the combination of a carriage and a twisting-frame pivotally hung in said carriage, substantially as described.

2. In a fence-machine, the combination of a carriage and a twisting-frame pivotally hung in said carriage and having means for holding it in a fixed position, substantially as described.

3. In a fence-machine, the combination of a carriage having set-screws and a twisting-frame pivotally hung in said carriage and having the slotted bars, substantially as and for the purpose set forth.

4. In a fence-machine, the combination of a carriage, a twisting-frame pivotally hung in said carriage, and means, substantially as described, for moving said carriage.

5. In a fence-machine, the combination of a carriage, a twisting-frame pivotally hung in said carriage, a drum on said carriage, and provided with a cable attached to a fixed point, and means for revolving and locking said drum, substantially as described.

6. In a fence-machine, the combination of a carriage, a twisting-frame pivotally hung in said carriage and provided with means for locking it with the carriage, and mechanism for moving the machine away from the fence already made, substantially as described.

7. In a fence-machine, the combination of a carriage having the plate provided with openings arranged in a vertical row, and the twisting-frame having the movable trunnions arranged to be journaled in said openings, substantially as described.

8. In a fence-machine, the combination of a carriage having the plates provided with openings arranged in a vertical row and with the set-screws and the twisting-frame having the removable trunnions and the slotted bars connected with said carriage, substantially as described.

9. In a fence-machine, the combination of the twisting-frame having the twisters projecting through the front end, the pivoted knockers arranged between the twisters and having the recesses in their edges, and means for operating said knockers, substantially as described.

10. In a fence-machine, the combination of the twisting-frame having the twisters projecting through the front end, the knockers arranged between the twisters, and having the recesses in their edges, the bar $E'$, connected to the knockers by cranks $e^3$, and the lever fulcrumed in the frame and pivotally connected with said bar, substantially as described.

11. In a fence-machine, the combination of a twisting-frame having the twisters projecting through the front end, the knockers carrying on their faces the projections having recesses with inclined walls, and means, substantially as described, for operating the knockers.

12. In a fence-machine, the combination of a twisting-frame having the twisters projecting through the front end, the knockers having the recesses in their edges and projections on their faces with inclined walls, and means, substantially as described, for operating the knockers.

13. In a fence-machine, a knocker having the recess in its edge, substantially as described.

14. In a fence-machine, a knocker carrying the projection on its face, having a recess with inclined walls, substantially as described.

15. In a fence-machine, a twister having a frame, a spool within the frame and formed of two sections, one section provided with an annular recess for the hub of the other section, and means for holding the sections together, substantially as described.

16. In a fence-machine, a twister having a a frame with sides formed of springy metal, a spool within its frame and formed of two sections, one section formed with an annular recess for the hub of the other section, and a shaft passing through said spool and frame and having means for clamping the parts together, substantially as described.

17. In a fence-machine, a twister having a frame, a spool having projections on one of its flanges, and a brake pivotally fastened to said frame, and a spring for holding the brake in contact with the spool, for the purpose set forth, in combination with means for withdrawing the brake, substantially as described.

18. In a fence-machine, the combination of the twisters having the brake, the knockers arranged between the twisters, the bars pivoted to the frame and connected with the brake and knockers, and a lever for operating the bars, substantially as described.

19. In a fence-machine, the combination of the twisting-frame, the arms pivoted to the frame and having the gage-bar provided with the handle, and the retracting-spring attached to one of the arms and the twisting-frame, substantially as described.

In testimony whereof I affix my signature in presence of two witnesses.

GEORGE W. HOMSHER.

Witnesses:
   GEO. R. BYINGTON,
   M. F. HALLECK.